US006171098B1

(12) United States Patent
Meyer et al.

(10) Patent No.: US 6,171,098 B1
(45) Date of Patent: Jan. 9, 2001

(54) RODENT EXTERMINATING APPARATUS

(76) Inventors: Monte W. Meyer, 2004 Granger Rd., Indian Valley, ID (US) 83632; Dan C. Newton, P.O. Box 160, Midvale, ID (US) 83645

( * ) Notice: Under 35 U.S.C. 154(b), the term of this patent shall be extended for 0 days.

(21) Appl. No.: 09/229,514

(22) Filed: Jan. 13, 1999

(51) Int. Cl.$^7$ .................................................. A01M 15/00
(52) U.S. Cl. .............................. 431/72; 431/91; 431/264; 431/344; 43/144
(58) Field of Search ........................ 43/124, 144; 431/91, 431/72, 344, 345, 264

(56) References Cited

U.S. PATENT DOCUMENTS

| 2,275,491 | * | 3/1942 | Barna | 431/345 |
| 2,417,981 | * | 3/1947 | Graham | 431/91 |
| 3,667,895 | * | 6/1972 | Ross | 431/345 |
| 4,005,976 | | 2/1977 | Rombach et al. | 431/13 |
| 4,688,140 | | 8/1987 | Hammes | 361/232 |
| 5,062,791 | * | 11/1991 | Liou | 431/344 |
| 5,860,243 | * | 1/1999 | Stager | 431/91 |

OTHER PUBLICATIONS

Advertisement from Feb. 1997 issue of Beef magazine, p. 38, Rid–A–Rodent, Inc., "Rodent Getter".

* cited by examiner

*Primary Examiner*—Ira S. Lazarus
*Assistant Examiner*—Sara Clarke
(74) *Attorney, Agent, or Firm*—Ken J. Pedersen; Barbara S. Pedersen

(57) ABSTRACT

The present portable exterminating apparatus uses an ignite charge of gas to produce both concussion and heat within the burrow of a rodent, along with residual toxic fumes, all contributing to rodent extermination. The apparatus includes a barrel, an injection control assembly, an ignition system, and a safety system including a pressure sensor and preferably a check valve. The mixing chamber of the apparatus mixes a flammable gas, such as propane, with oxygen, preferably from a bottled oxygen source, at a desired ratio. The barrel nozzle is placed into the burrow opening, and the flammable mixture is discharged into the burrow, and subsequently ignited. The ignition system including a battery, an ignition switch, and an improved ignition component inducing arcing across a pair of electrodes located within the nozzle of the barrel. The ignition switch is preferably located near the discharge valve for one-hand operation of the apparatus. The pressure switch prevents ignition of the mixture until the pressure of the mixture in the upper barrel has dropped after the operator has closed the discharge valve.

7 Claims, 5 Drawing Sheets

RODENT EXTERMINATING APPARATUS

BACKGROUND OF THE INVENTION

1. Field of the Invention

The present invention generally relates to devices for the extermination of rodents. More specifically, the present invention is a device for the injection of a flammable gas into burrows of rodents and the subsequent detonation of said gas, thereby eradicating the rodents.

2. Related Art

Burrowing rodents are well know for making underground passageways, referred to as burrows, and holes extending from these burrows to the surface of the ground. Burrowing rodents cause many problems for property owners, farmers and ranchers. Burrowing rodents cause: damage to growing crops, lumber and landscapes by destroying plant root systems and eating vegetation; damage to canals and other waterways by digging holes through the sides of such waterways, resulting in lost water rights and flooding; wear and tear on equipment (such as tractors) which often need to drive across burrow and hole pockmarked fields; increased erosion; and physical harm to humans and animals who accidentally step within rodent holes or whose steps break through the surface of the ground, breaking through to a burrow causing injury to the human or animal unlucky enough to step in such.

Burrowing rodents being pests and causing such damage has resulted in property owners, ranchers and farmers eradicating the rodents themselves or paying to have the rodents eradicated. Such "rodents" including: prairie dogs, gophers, and ground squirrels.

Known exterminating apparatuses and methods for eliminating rodents include the use of traps and poisons. However, the use of traps has been found to be both uneconomical and unreliable, and the use of poisons is not desirable due to the effects on the environment and effects on other animals which eat poison coated vegetation, eat living rodents who have consumed some amount of the poison, and even scavengers which eat the carcasses of rodents killed through the use of such poison.

Inefficiencies and problems with the prior ways of exterminating rodents lead to the invention of a gas fired apparatus for discharging an inflammable gaseous vapor into the rodents' burrows and igniting the mixture, such as is shown in Rombach et. al., U.S. Pat. No. 4,005,976. However, drawbacks in the technology shown in Rombach et al. include a lack of portability, a need for greater simplicity, the failure to use safety devices such as a check valve or a pressure sensor, and the lack of the use of an oxygen source in conjunction with the inflammable gas.

Another known invention was discovered by the inventors, and discussed further infra. The invention comprises a rodent extermination device having both oxygen and inflammable gas inputs, but failing to have safety devices, such as a check valve or pressure sensor. This prior art version also utilized an ignitor requiring the use of an automobile or automobile battery in order supply the required electrical current. Such a requirement greatly reduced the portability of the device.

What is needed is a gas fired apparatus for discharging a mixture of inflammable gas and oxygen vapors into rodents' burrows and igniting the mixture that also has the safety features of a pressure sensor and having an improved ignition system.

SUMMARY OF THE INVENTION

The present invention is embodied within a portable exterminating apparatus using an ignited charge of gas to produce both concussion and heat within the burrow, along with residual toxic fumes, all contributing to rodent extermination. The heat, concussion and toxicity produced by the present apparatus have a cumulative effect which greatly increases its effectiveness.

The present invention comprises: a barrel, an injection control assembly, an ignition system, and a barrel system.

The barrel from the barrel system of the apparatus is positioned for insertion of its nozzled end into a burrow, or other closed area, opening facilitating discharge of a mixture of oxygen and an inflammable gas into the rodent's burrow and the subsequent ignition of this mixture. The injection control assembly includes a mixing chamber allowing for the mixing of an inflammable gas, such as propane, with oxygen, preferably from a bottled oxygen source, at a desired ratio. This ratio being variable by means of pair of adjustable valve members, one regulating the oxygen intake opening and the other regulating the gas intake opening. This mixture is then discharged by the user, while the apparatus is in use, into the barrel through use of a discharge valve. The ignition switch is conveniently located near the discharge valve for convenient one-hand operation of the apparatus. The ignition switch is part of the ignition system further comprising a battery and an ignition component inducing arcing across an igniter, such as the preferred electrodes located within the nozzled end of the apparatus. Upon injecting a quantity of the mixture into the burrow, the user ignites the mixture by depressing the ignition switch.

Important objects of the present apparatus include: the provision of an extermination apparatus discharging a quantity of a gas/oxygen mixture into a burrow and thereafter igniting same to impart both concussion and heat to the burrow which along with the residual toxic fumes assure extermination of the rodent or rodents; an extermination apparatus having adjustable valve members to regulating the intake and subsequent mixture of oxygen and gas for optimum ignition; the provision of an exterminating apparatus wherein both ignition and gas/oxygen flow control means are incorporated conveniently for operation in a single handed manner; and the safety resulting from the combination of the use of a check valve keeping the mixture within the barrel from being ignited and a pressure sensor keeping the exterminator from firing until the user has stopped the release of the mixture into the burrow, and the use of an improved ignition system.

DESCRIPTION OF THE PREFERRED EMBODIMENTS

In the present invention, the following terms have the following meanings, unless explicitly noted otherwise:

"proximal" refers to the injection control assembly end of the present invention and "distal" refers to the nozzle end of the present invention.

The present invention is a portable rodent extermination apparatus comprising an injection control assembly 20 for controlling the injection of a mixture of oxygen and an inflammable gas, such as propane, into a rodent burrow; an ignition system 30 for igniting said mixture in said burrow; and a barrel system 40 for transfer of the mixture from the injection control assembly to the burrow.

Figure 1:
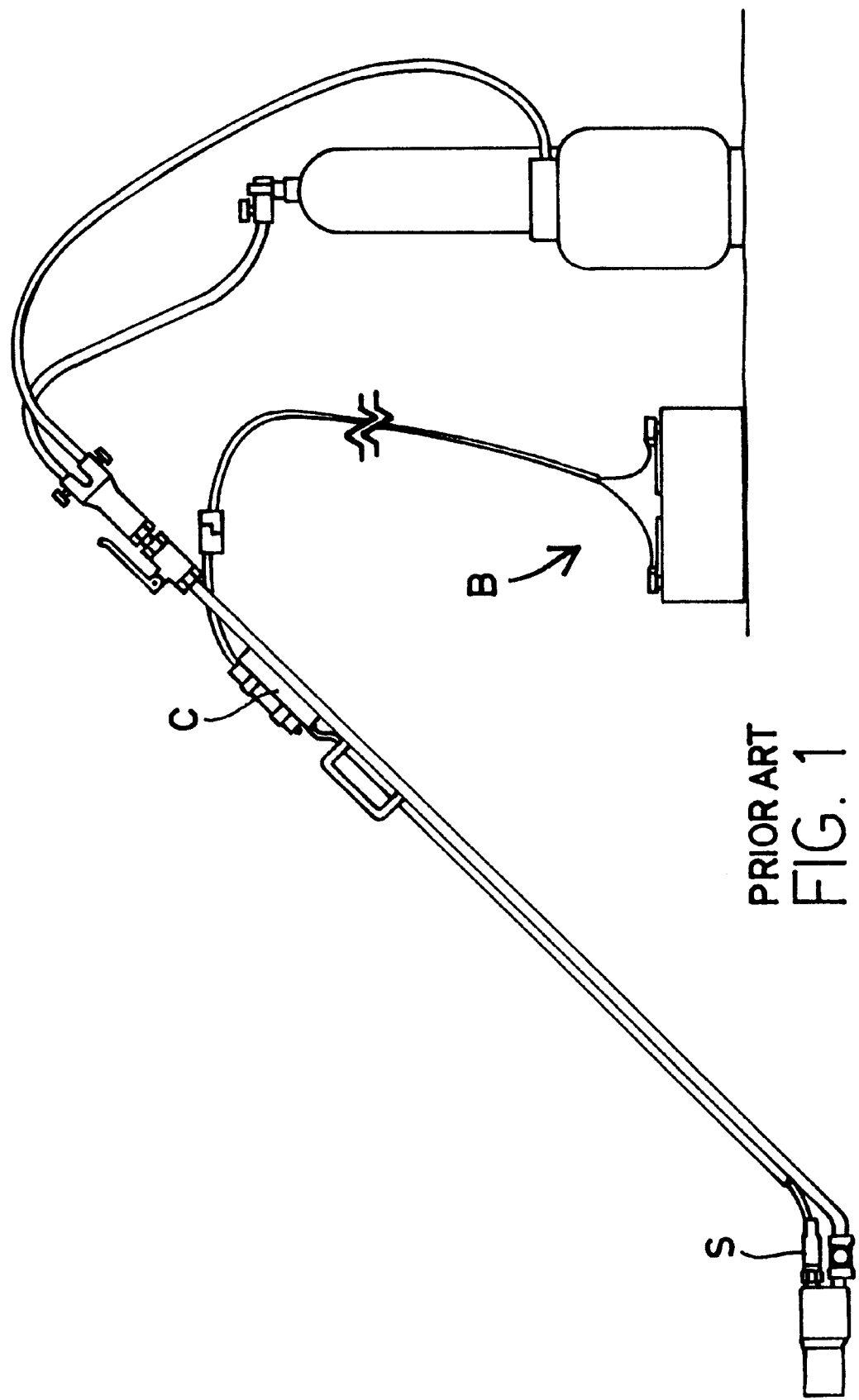
FIG. 1 is a side view of an article of PRIOR ART discovered by the inventors.

FIG. 1 shows a prior art device that the inventors purchased via mail order, from Rid-A-Rodent, Inc. in Elko, Nev. The inventors have been unable to confirm whether the device is patented, but have seen recent advertisements marked Patent pending. The prior art device uses an automobile coil C connected via a 25' long cable to a 12-volt automobile battery B for increasing the voltage and a common automotive sparkplug S for generation of the ignition spark. By needing a connection to an automobile battery, the prior art device has a portability range only within a 50' arc. However, the present invention has at least a portability range within a 100' arc (when the present invention is used with 50' long supply lines) and possibly fully portable through the use of a backpack for carrying a pair of small tanks, one for the gas supply and one for oxygen. The prior art device also failed to have a pressure sensor like the present invention, undesirably and unsafely allowing the user to ignite the mixture while still releasing additional quantities of the mixture. Another flaw within the prior art version was the location of the ignition switch in relation to the injection trigger. In the prior art version, the ignition switch was located adjacent to the injection trigger, often leading to accidental release of a mixture of gas and oxygen and its accidental ignition.

Figure 2:
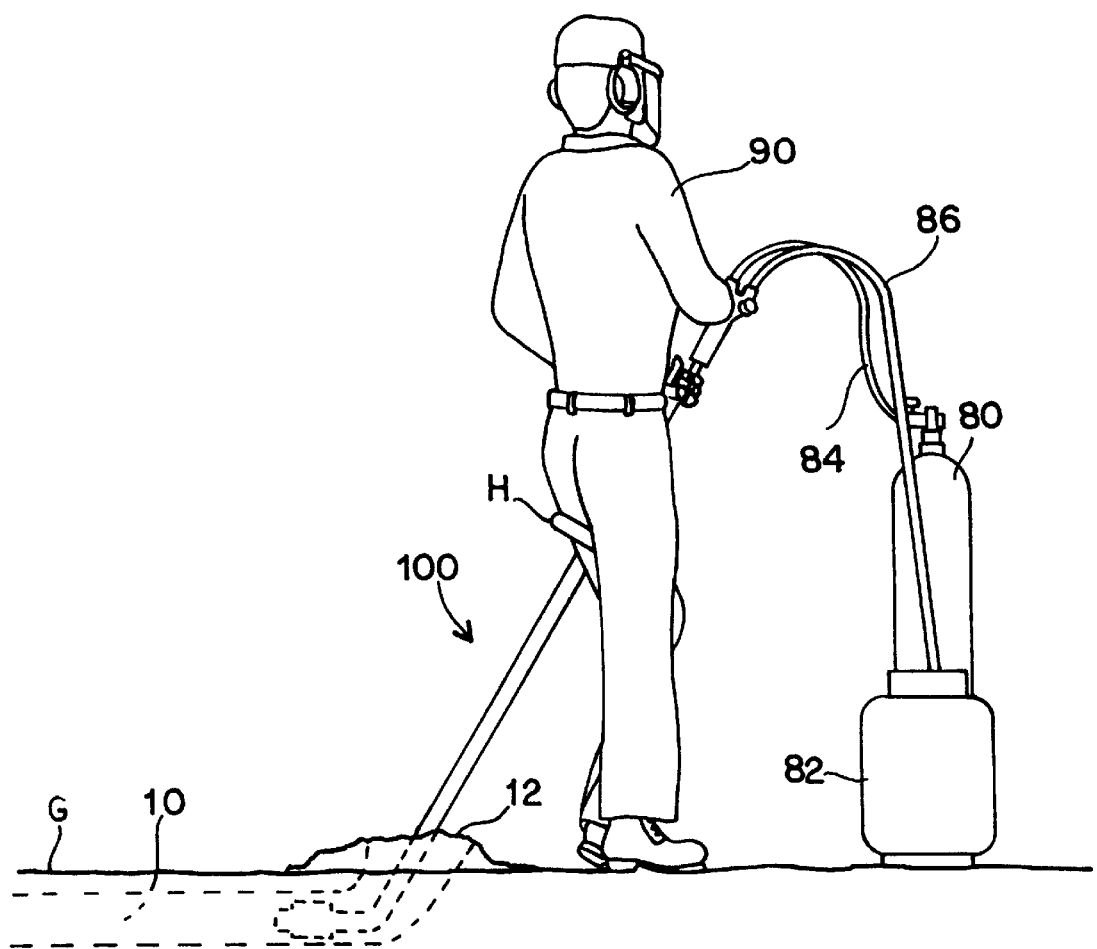
FIG. 2 is a side view of the present invention in use, shown inserted into a burrow.
Figure 3A:
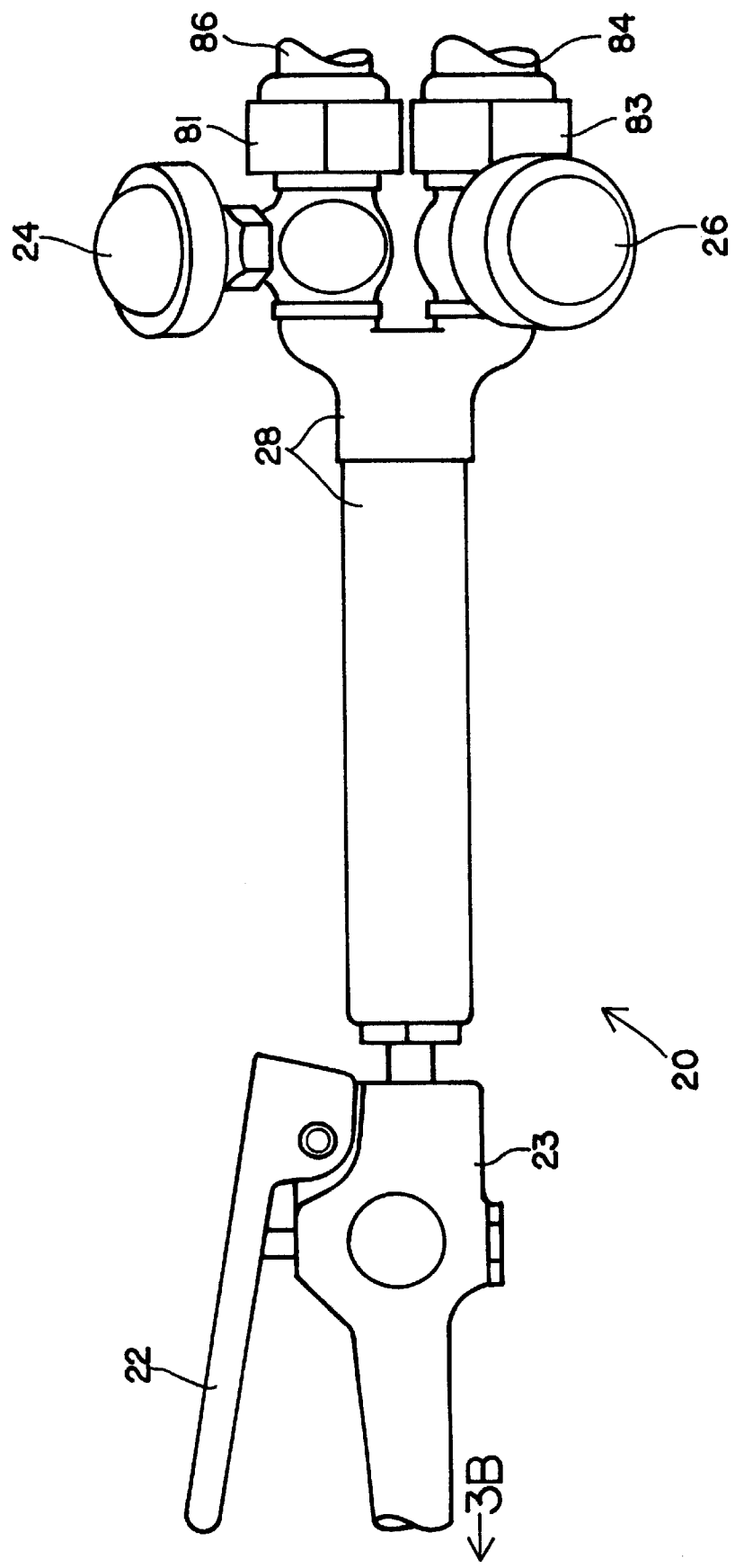
FIG. 3A is a side, partial, cross-sectional, detail view of the injection control assembly end of one embodiment of the present invention.

As shown in FIG. 2, the present invention 100 connects to an oxygen source 80, such as an oxygen tank. The present invention 100 also connects to an inflammable gas source 82, such as a propane tank. A flexible oxygen supply line 84 extends from the oxygen source 80 and to the present invention 100, attaching into the injection control assembly 20 at a second adjustable means 26, as shown in FIG. 3A. Referring back to FIG. 2, a flexible gas supply line 86 extends from the gas source 82 and to the present invention 100, attaching into the injection control assembly 20 at a first adjustable means 24, as shown in FIG. 3A. The supply lines 86, 84 are preferably less than or equal to 50' long. Both supply lines 84, 86 flow through one-way valves 81, 83 before their attachment with the first and second adjustable means 24, 26. These one-way valves 81, 83 keep mixture from flowing backwards through the adjustable means 24, 26 and into the supply lines 84, 86. The preferred one-way valves are Forney #87147 valves. FIG. 2 also shows the use of a preferred handle H, which is preferably of such a size that the user can rest his or her leg against the handle to add stability to the invention when the invention is fired.

As shown in FIG. 3A, and as mentioned above, the injection control assembly 20 includes a pair of adjustable means or valves 24, 26, the first 24 of which controls the input of gas and the second 26 of which controls the input of oxygen into the present invention. The preferred controls are turn knob dials allowing the user to merely turn a dial in order to increase or decrease the amount of oxygen or gas released.

The preferred mixture is created through the following process: first the regulator on the oxygen source 80 is set at 30 pounds of pressure and the regulator on the propane source 82 is set at 15 pounds of pressure. Then, starting with both means 24, 26 in the closed position, the first adjustable (gas) means 24 is opened by turning the knob on the means 24 one-quarter rotation, and the second adjustable (oxygen) means 26 is opened by turning the knob on the means 26 one and one-half rotations. Such a set up yields the proper mixture, causing an explosion of the mixture when ignited and not resulting in burning of the mixture.

A mixing chamber 28 connects to these adjustable means 24, 26. Said mixing chamber 28 serves as a reservoir where the quantities of gas and oxygen are mixed with one another. The discharge valve 23 connects to the mixing chamber 28. Actuation of an injection trigger or handle 22 causes the opening of the discharge valve 23, and the release of a quantity of the mixture into the connected upper barrel 41 of the barrel system 40 of the present invention 100. Continuous actuation of the trigger 22 has the result of releasing a continuous amount the mixture into the upper barrel 41.

The preferred injection control assembly 20 is a Forney torch handle, part number 87093. The preferred mixing barrel and adjustment means is an one-piece article is known as a Forney mixing tip, part number 87795.

Figure 3B:
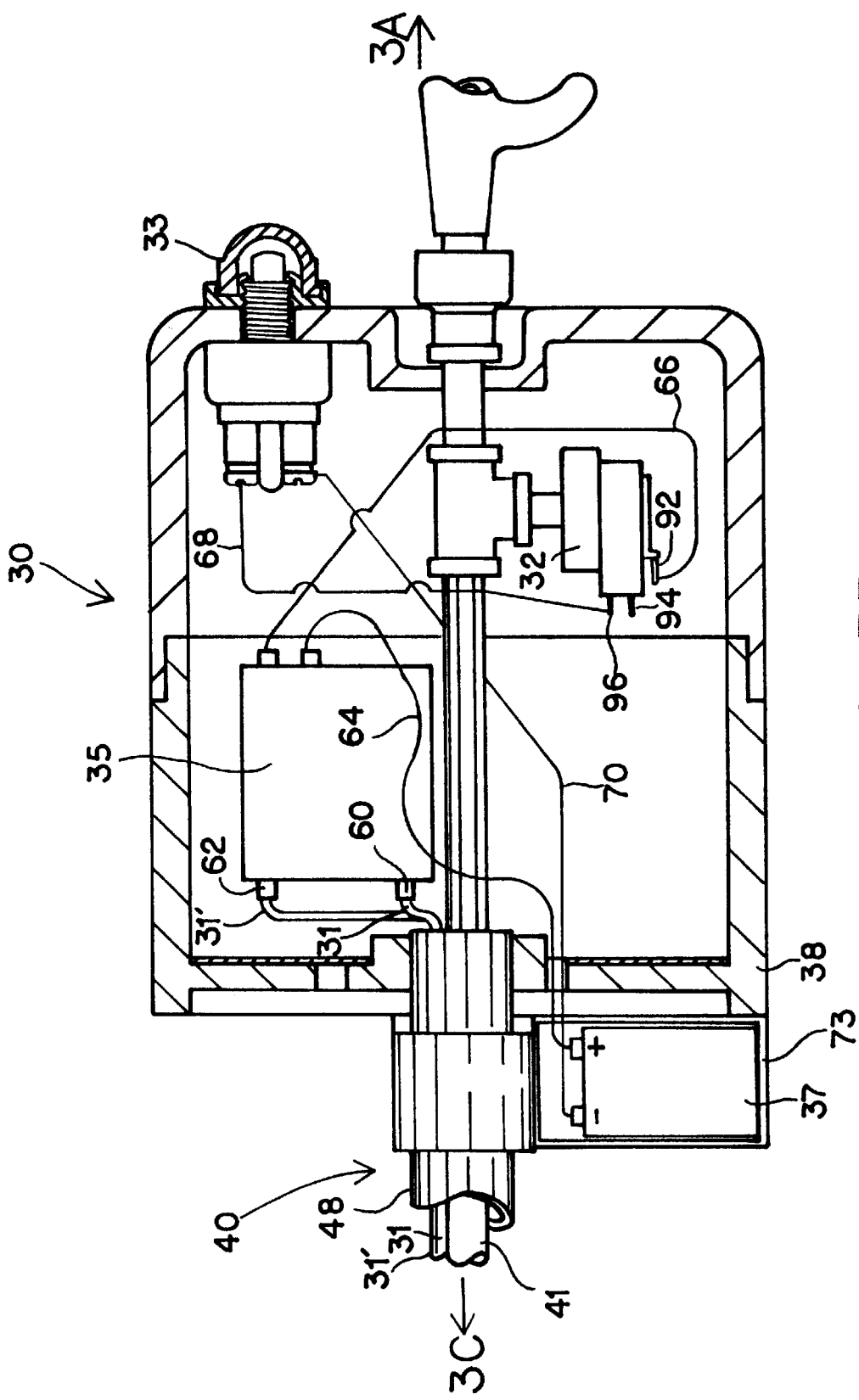
FIG. 3B is a side, partial, cross-sectional, detail view of the ignition system and center of one embodiment of the present invention.
Figure 3C:
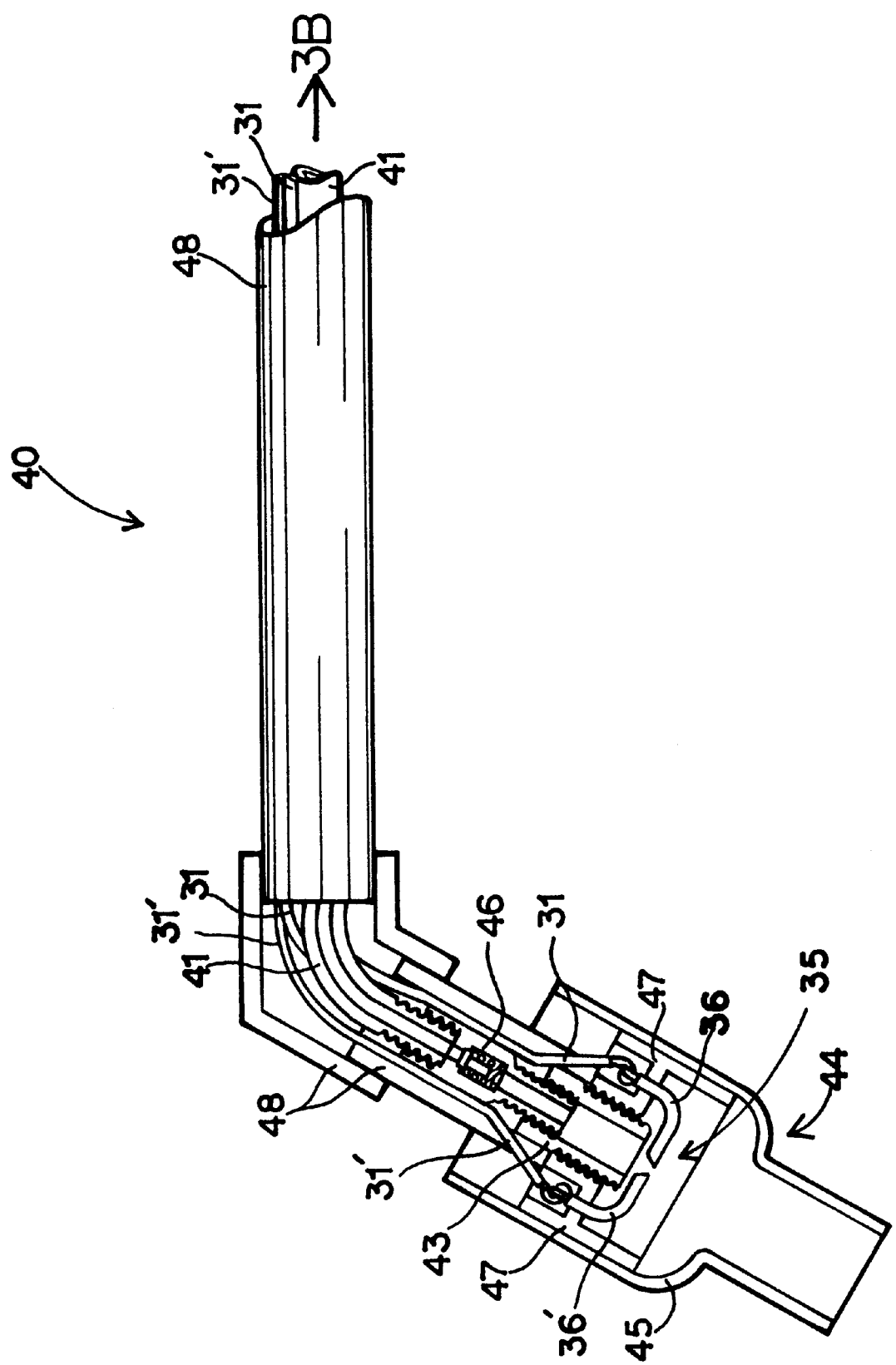
FIG. 3C is a side, partial, cross-sectional, detail view of the nozzled end of one embodiment of the present invention.

Referring to FIGS. 3A–3C, the barrel system 40 of the preferred embodiment of the present invention 100 comprises an upper barrel 41, a check valve 46, a lower barrel 43, and a barrel shroud 48. The upper barrel 41 connects to the mixing chamber 28. Such connection is preferably done through a threaded outer surface of the proximal end of the upper barrel 41 received into a thread receiving portion of the mixing chamber 28. The mixture flows out of the mixing chamber 28 and into the upper barrel 41. The upper barrel 41 is a narrow and elongated piece extending away from the injection control assembly 20, through the ignition protective shroud 38 (as shown in FIG. 3B), and to the nozzled end of the present invention. As shown in FIG. 3C, preferably, the end of the upper barrel 41 opposite the injection control assembly 20 has a slight bend within it allowing for easier insertion into the ground of the nozzle system 44 end of the apparatus. Rather than a bend, an elbow-type joint or other method could be used.

Referring to FIG. 3C, connecting in-line near the distal end of the upper barrel 41 is a check valve 46. Such connection is preferably done through a threaded outer surface of the distal end of the upper barrel 41 being received into the proximal end of the check valve 46. The check valve 46 serves to prevent the back flow of ignited mixture into the upper barrel 41 and upwards towards the user and the source of the gas 82. The check valve 46 is a one-way valve allowing the mixture to only travel from the upper barrel 41 through the check valve 46 and into the lower barrel 43. The preferred check valve 46 is a National Torch Tip model FA-10 which opens when 3.0 ounces of pressure are present, and closes when the pressure within the barrel system 40 drops below 3.0 ounces of pressure. Ten ounces of back pressure will cause this model check valve to close as well.

In use, as the user depresses the injection trigger 22, the mixture is released from the mixing chamber 28 and is allowed to travel into the upper barrel 41. The pressure of the mixture flowing through the upper barrel 41 causes the check valve 46 to open as the mixture reaches the check valve 46. The mixture then flows through the check valve 46. When the user deactivates the injection trigger 22, the pressure within the barrel drops, causing the check valve 46 to close, thereby inhibiting ignited mixture from traveling up the barrel system 40.

Connecting in-line to the distal end of the check valve 46 is the proximal end of the lower barrel 43. Such connection is preferably from a threaded protuberance extending from the distal end of the check valve 46 being received into a threaded inner portion of the lower barrel 43. The lower barrel 43 may comprise an elongated section or may only comprise a connection between the check valve 46 and the nozzle system 44. Mixture passing through the check valve 46 is able to pass through the lower barrel 43. The distal end of the lower barrel 43 connects to the nozzle system 44. Preferably, such connection connects the lower barrel 43 to a nozzle cap 47. Such connection is preferably done through the threading of threads located on the outside surface of the distal end of the lower barrel 43 into threads located within the proximal end of the nozzle cap 47.

The nozzle system 44 preferably comprises: a nozzle 45 and a nozzle cap 47 inserted and affixed within the nozzle 45. The nozzle cap 47 serves to center the distal end of the lower barrel 43 in the nozzle 45. The nozzle cap 47 also serves as the location where the electrodes 36, 36' from the igniter 35 of the ignition system 30 are located.

The electrodes 36, 36' extend generally distally and inward from the distal surface of the nozzle cap 47. The electrodes 36, 36' are preferably located within the nozzle 45 a short distance apart so that when the ignition system 30 is activated, a spark will be able to arc from one electrode 36 to the other 36'. Such arching takes place at the distal end of the electrodes 36, 36'. If a quantity of the mixture is present in the burrow when this arcing happens, then the mixture will be ignited. Preferably these electrodes 36, 36' are made of bent brass screws, however other electrodes are also envisioned. Preferably these electrodes 36, 36' are located 0.25 to 0.5 inches apart.

Preferably, the proximal end of the nozzle 45, which contains the nozzle cap 47 and electrodes 36, 36, is filled with a high temperature glue or other material, so as to inhibit the transmittal of mixture from within the burrow to upwards inside the barrel protective shroud 48 of the barrel and into the ignition protective shroud 38, and to solidify and strengthen the nozzle system 44.

The proximal end of each of the electrodes 36, 36' attach to an ignition wire 31 through the common method. The ignition wires 31 extend from their connection with the electrodes 36, 36' along the barrel system 40, through the barrel protective shroud 48, and into the ignition protective shroud 38 which serves to protect the ignition system 30 from damage.

The protective shrouds 38, 48 are preferably made of PVC or other lightweight plastic. The ignition protective shroud 38 serves as the location where the ignitor 35, battery 37 and ignition switch 33 are attached and located. Preferably, the shroud 38 is able to be opened and closed, giving the user 90 access to the internal components. Preferably, the shroud 38 is water-tight protecting the internal components from moisture. Preferably, the ignitor 35 is located within the shroud 38 and the ignition switch 33 extends through and is attached to the shroud 38, allowing the user to activate the ignition switch 33 without opening the shroud 38. Preferably, the battery 37 is located within a separate battery box 73 allowing the user to easily change the battery 37 without needing to open the ignition shroud 38. Preferably, a pair of batteries are used to extend the length of time the invention can be used without replacing the batteries.

Referring to FIG. 3B, the ignition wires 31, 31' connect with the ignitor 35. This is done by one ignition wire 31 connecting to a first output terminal 60, and the second ignition wire 31' connecting to a second output terminal 62. The preferred ignitor 35 comprises a common stun gun, such as shown in U.S. Pat. No. 4,668,140, and related patents. With a common stun gun, when the stun gun's switch is depressed, a battery, commonly a 9-volt battery, delivers a charge to the basic electronic circuit in the device which produces a pulse utilizing a non-linear relaxation oscillator producing approximately twenty pulses per second. Additional components of a common stun gun include a transistor, diodes, and an oscillator transformer which creates a charge across a capacitor. Once the arc potential of an internal spark gap is reached, a magnetic field in the oscillator transformer collapses suddenly to create a brief high voltage pulse across the output terminals. Generally, such a device comprises a mechanism designed to emit a pulsing high voltage, low amperage pulse or charge, including devices that achieve this through electronic, magnetic, phase induction, laser, and other types of charges. Such stun gun technology is not part of the invention except as it is recited in the following claims in combination with other elements to form the inventors' portable rodent exterminating device, because stun gun technology is well known to those skilled in the art.

The use of such a common stun gun as the invention's ignitor 35 is preferred for multiple reasons, including the high voltage of the spark caused, the low voltage input requirement (typically only a 9-volt battery) and the fact that a stun gun sends an pulsing arc, rather than a singular arc as would be caused by a spark plug.

In the present invention, the ignitor 35 has a pair of output terminals 60, 62 and a pair of input leads. The output terminals 60, 62 each, individually attach to one of the ignition wires 31, 31' as discussed supra. The pair of input leads further comprise a positive input lead 64 and a negative input lead 66. The positive input lead 64 connects to the positive terminal on the battery 37, and the negative input lead 66 connects to the top terminal 92 on the pressure sensor 32. A pressure sensor output lead 68 connects the second terminal of the ignition switch 33 to a bottom terminal 96 of the pressure sensor 32 and a battery ground lead 70 connects the first terminal of the ignition switch 33 to the negative terminal of the battery 37. No connection is made to the middle terminal 94 of the preferred pressure sensor (discussed infra). These connections connect the electrical circuit.

When the ignitor 35 is connected in such a manner, the action of depressing or otherwise toggling the ignition switch 33 allows the battery 37 to deliver a charge to the basic electronic circuit in the ignitor 35 which produces brief high voltage pulse which is transmitted through the ignition wires 31, 31' resulting in arcing between the two electrodes 36, 36' located within the nozzle system 44, and ignition of the mixture previously delivered to the burrow. However, such charge is only allowed to be delivered to the ignitor 35 when the pressure within the upper barrel 41 drops below the threshold programmed or set within the pressure sensor 32.

The pressure sensor 32 is attached in-line, having a sensor component extending into the upper barrel 41. Preferably, the pressure sensor 32 opens the electrical circuit it is connected to when greater than 0.03 pounds of pressure exists within the upper barrel 41. When the pressure within the upper barrel 41 is less than 0.03 pounds of pressure, the pressure sensor 32 closes the electrical circuit. The pressure sensor preferably used is a World Magnetics model 9061-03 PS F103 series sensor. The pressure sensor 32 is an important safety feature, keeping the present invention from igniting the gaseous mixture until after the user has de-actuated the injection trigger or handle 22. Within a few seconds of de-actuation of the injection handle 22, the pressure within the upper barrel 41 drops low enough to allow the user 90 to discharge the ignitor 35.

In operation, referring again to FIG. 2, the apparatus is able to be inserted by the user 90 into a burrow passages 10 in the ground (G) through a burrow opening or hole 12, whereupon the injection trigger 22 is actuated to provide a flow of mixed gas and oxygen into the burrow opening 12 and burrow passages 10. When the user 90 determines that burrow has been suitably filled with the flammable mixture, the user releases and de-actuates the injection trigger 22. When a sufficient amount of time, usually 1–2 seconds, has passed for the pressure within the barrel system 40 to drop below the settings on the pressure sensor 32, the pressure sensor 32 will allow the closing of the ignition circuit, thereby allowing the user to send a current from a battery 37, to the ignitor 35 by actuation of the ignitor switch 33, thus resulting in an electrical arc across the electrodes 36 of the ignitor 35, and igniting the mixture within the burrow 10.

While the above description has been in conjunction with the use of the present apparatus for the extermination of burrowing rodents, such is not intended to imply any limitation of the use for the present apparatus as it may be used, for example, in other applications such as extermination of burrowing reptiles, such a snakes, or the ignition of slash piles of wood.

Although this invention has been described above with reference to particular means, materials and embodiments, it is to be understood that the invention is not limited to these disclosed particulars, but extends instead to all equivalents within the scope of the following claims.

We claim:

1. A portable apparatus for discharging and igniting a mixture of a quantity of flammable gas mixed with a quantity of oxygen within a closed area, said apparatus comprising:

a barrel, said barrel further comprising a nozzle for discharge of the mixture;

an injection control assembly, said injection control assembly further comprising a first adjustor regulating the quantity of flammable gas to be inputted into the mixture, a second adjustor regulating the quantity of oxygen to be inputted into the mixture, a mixing chamber for mixing the flammable gas and the oxygen, and an injection handle for releasing said mixture into the barrel, said injection handle able to be actuated and de-actuated by a user; and an ignition system comprising a pair of electrodes mounted within said nozzle, an ignitor switch for activating an ignitor and delivering a charge to an electrical circuit thereby producing an arc between a pair of electrodes, thereby causing the ignition of the discharged mixture wherein said ignition system further comprises a pressure sensor for keeping the apparatus from igniting the mixture until after the user has de-actuated the injection handle.

2. An apparatus, as in claim 1, wherein said ignition system, except for said pair of electrodes, is enclosed within a protective shroud.

3. An apparatus, as in claim 1, wherein said barrel further comprises a protective shroud.

4. An apparatus, as in claim 1, wherein said barrel further comprises a check valve for stopping the back flow of ignited mixture into the barrel system.

5. An apparatus, as in claim 1, wherein said ignitor further comprises a mechanism designed to emit a pulsing high voltage, low amperage charge.

6. A portable apparatus for discharging and igniting a mixture of a quantity of flammable gas mixed with a quantity of oxygen within a closed area, said apparatus comprising:

a barrel comprising an upper barrel and an opposing nozzle for discharge of a mixture of flammable gas and oxygen;

an injection control assembly comprising a controller system for regulating the quantities of flammable gas and oxygen to be inputted into the mixture, a mixing chamber for mixing the flammable gas and the oxygen, and an injection handle for releasing said mixture into the barrel, said injection handle able to be actuated and de-actuated by a user; and an ignition system comprising a pair of electrodes mounted within said nozzle an ignitor switch operatively connected to an ignitor designed to emit a pulsing high voltage, low amperage charge to an electrical circuit thereby producing an arc between the electrodes and igniting the discharged mixture, and wherein said ignition system further comprises a pressure sensor extending into the upper barrel and sensing pressure in the upper barrel to prevent the apparatus from igniting the gaseous mixture until after the user has de-actuated the injection handle and pressure of the gaseous mixture in the upper barrel has decreased.

7. An apparatus as in claim 6, wherein the pressure sensor prevents ignition of the gaseous mixture when pressure within the upper barrel is above about 0.03 psig.

* * * * *